(12) United States Patent
Boschi et al.

(10) Patent No.: US 10,093,170 B2
(45) Date of Patent: Oct. 9, 2018

(54) INTAKE AIR DUCT FOR AN INTERNAL COMBUSTION ENGINE OF AN AGRICULTURAL VEHICLE

(71) Applicant: CNH Industrial America LLC, New Holland, PA (US)

(72) Inventors: Luca Boschi, Modena (IT); Fabio Pescione, Modena (IT)

(73) Assignee: CNH Industrial America LLC, New Holland, PA (US)

( * ) Notice: Subject to any disclaimer, the term of this patent is extended or adjusted under 35 U.S.C. 154(b) by 2 days.

(21) Appl. No.: 15/104,911

(22) PCT Filed: Dec. 11, 2014

(86) PCT No.: PCT/EP2014/077471
§ 371 (c)(1),
(2) Date: Jun. 15, 2016

(87) PCT Pub. No.: WO2015/091224
PCT Pub. Date: Jun. 25, 2015

(65) Prior Publication Data
US 2016/0318386 A1    Nov. 3, 2016

(30) Foreign Application Priority Data
Dec. 17, 2013   (IT) .............................. MO2013A0347

(51) Int. Cl.
*B60K 11/08*    (2006.01)
*B60K 13/02*    (2006.01)
(Continued)

(52) U.S. Cl.
CPC ............. *B60K 11/08* (2013.01); *A01B 76/00* (2013.01); *B60K 11/06* (2013.01); *B60K 13/02* (2013.01);
(Continued)

(58) Field of Classification Search
None
See application file for complete search history.

(56) References Cited

U.S. PATENT DOCUMENTS

| 4,366,878 A * | 1/1983 | Warf ...................... B60K 13/02 180/68.3 |
| 6,503,139 B2 * | 1/2003 | Coral .................... B08B 15/002 285/184 |

(Continued)

FOREIGN PATENT DOCUMENTS

| EP | 0507358 | 10/1992 |
| EP | 1955903 | 8/2008 |

(Continued)

OTHER PUBLICATIONS

PCT/EP2014/077471 International Search Report and Written Opinion dated Mar. 25, 2015.

*Primary Examiner* — John Daniel Walters
*Assistant Examiner* — Hilary Lynn Johns
(74) *Attorney, Agent, or Firm* — Rickard K. DeMille; Rebecca L. Henkel

(57) ABSTRACT

An agricultural vehicle is disclosed having an engine compartment. A cooling package is mounted near a forward end of the engine compartment, the cooling packaging including heat exchangers that are movable relative to one another between an operating position and a cleaning position. The engine is mounted near a rearward end of the engine compartment. The engine is fitted with an intake air duct leading from the engine to the forward end of the engine compartment to allow intake air to be admitted into the engine while bypassing the cooling package and thereby avoiding the engine intake air being heated. The intake air duct is articulated so as not to interfere with the movement (Continued)

of the heat exchangers of the cooling package between the operating and cleaning positions.

11 Claims, 3 Drawing Sheets

(51) Int. Cl.
    *F02M 35/16*     (2006.01)
    *F02B 29/04*     (2006.01)
    *F02M 35/04*     (2006.01)
    *A01B 76/00*     (2006.01)
    *B60K 11/06*     (2006.01)
    *B60K 11/04*     (2006.01)

(52) U.S. Cl.
    CPC ....... *F02B 29/0412* (2013.01); *F02M 35/042* (2013.01); *F02M 35/048* (2013.01); *F02M 35/164* (2013.01); *B60K 11/04* (2013.01); *B60Y 2200/221* (2013.01); *Y02T 10/146* (2013.01)

(56) References Cited

U.S. PATENT DOCUMENTS

| | | | |
|---|---|---|---|
| 2004/0262061 | A1 | 12/2004 | Bahr et al. |
| 2009/0031980 | A1* | 2/2009 | Choi ................ F02M 35/10013 123/184.53 |
| 2009/0038775 | A1* | 2/2009 | Leconte ................ B60K 11/04 165/67 |
| 2009/0242296 | A1 | 10/2009 | Goldsberry |

FOREIGN PATENT DOCUMENTS

| | | |
|---|---|---|
| JP | 2010158921 | 7/2010 |
| JP | 2010163036 | 7/2010 |
| WO | 2007077491 | 7/2007 |

\* cited by examiner

INTAKE AIR DUCT FOR AN INTERNAL COMBUSTION ENGINE OF AN AGRICULTURAL VEHICLE

CROSS REFERENCE TO RELATED APPLICATIONS

This application is a national stage of PCT Application No. PCT/EP2014/077471, entitled "INTAKE AIR DUCT FOR AN INTERNAL COMBUSTION ENGINE OF AN AGRICULTURAL VEHICLE", filed on Dec. 11, 2014, which claims priority from the benefit of Italian Patent Application Serial No. MO2013A000347, filed on Dec. 17, 2013. Each of the foregoing applications is hereby incorporated by reference in its entirety.

FIELD OF THE INVENTION

The present invention relates to an intake air duct for an internal combustion engine of an agricultural vehicle.

BACKGROUND OF THE INVENTION

Agricultural vehicles, such as tractors, commonly have a large radiator positioned at the front end of the engine compartment, beneath a hinged hood, to cool the engine coolant. In addition, further heat exchangers such as an intake charge intercooler or an oil cooler may be positioned forward of the engine coolant radiator. In combination, these various heat exchangers will be referred to herein as a cooling package.

Between them, the heat exchangers of the cooling package give off considerable amounts of heat. It is desirable to ensure that the heat emitted by the cooling package does not heat the engine intake air as this would reduce engine efficiency. For this reason, it has previously been proposed in US2004/262061 to design the engine compartment in such a manner as to provide a bypass path that allows intake air admitted into the engine compartment through a grille in the hood to reach the engine without being heated by the cooling package.

Agricultural vehicles often operate in an environment where dust and other particulate matter are suspended in the air and the cooling package is therefore prone to blockage. For this reason, the heat exchangers are therefore often movably mounted relative to one another in order to allow for the cooling package to be cleaned.

OBJECT OF THE INVENTION

The aim of the present invention is to enable the engine of an agricultural vehicle to draw in air from as near to the front of the engine compartment as possible, to avoid its being heated by the cooling package, without nevertheless interfering with the ability of the heat exchangers of the cooling package to be moved to a position in which the cooling package can be cleaned.

SUMMARY OF THE INVENTION

According to the present invention, there is provided an agricultural vehicle having an engine compartment, a cooling package mounted near a forward end of the engine compartment, the cooling package including heat exchangers that are movable relative to one another between an operating position and a cleaning position, and an engine mounted near a rearward end of the engine compartment, characterised in that the engine is fitted with an intake air duct leading from the engine to the forward end of the engine compartment to allow intake air to be admitted into the engine while bypassing the cooling package and thereby avoiding the engine intake air being heated, the intake air duct being articulated to accommodate movement of the heat exchangers of the cooling package between the operating and cleaning positions.

In an embodiment of the invention, the intake air duct is formed of two rigid sections that are pivotable relative to one another, a first of the sections being stationarily mounted in the engine compartment and the second section being pivotable to accommodate movements of the heat exchangers of the cooling package between the operating and cleaning positions.

The second section may be spring biased to return to an operating position of the intake air duct automatically with return of the heat exchangers of the cooling package to the operating position.

It is important to design the air intake duct in such a manner as to minimize flow resistance to the intake air. In particular, it is preferred for the inner surfaces of the intake air duct to be smooth.

As the forward end of the intake air duct may be positioned very close to a grille in the hood of the engine compartment, it is possible that water may enter the intake air duct. To avoid such water entering the engine intake system, it is desirable to form a step in a lower wall of the intake air duct to act as a dam in the path of water flowing towards the engine and to provide drainage holes at the bottom of the step. The height of the dam should again be minimised to avoid obstructing the intake air.

BRIEF DESCRIPTION OF THE DRAWINGS

The invention will now be described further, by way of example, with reference to the accompanying drawings, in which.

DETAILED DESCRIPTION OF THE INVENTION

Figure 1:
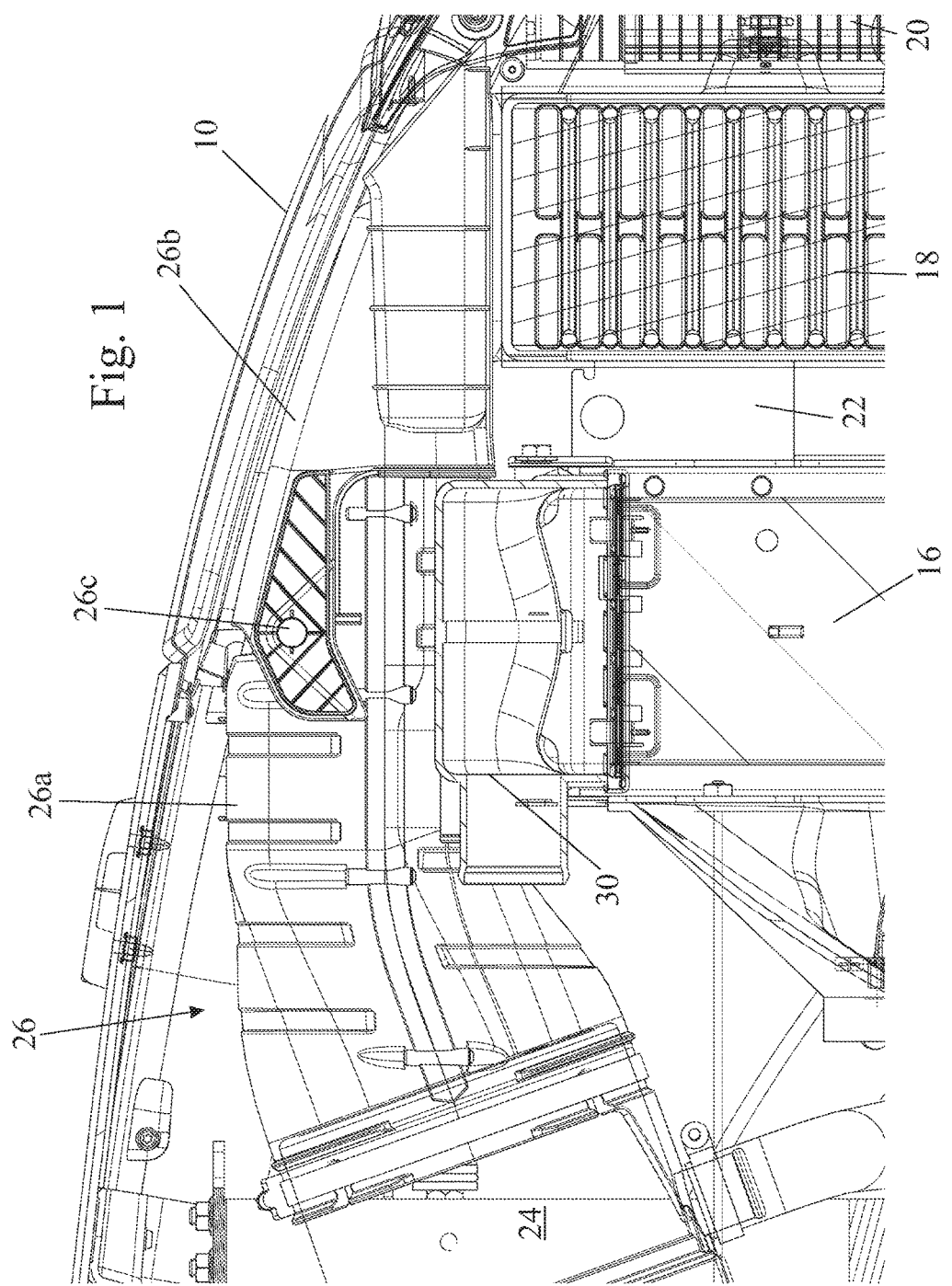
FIG. 1 is a side view of the interior of the engine compartment with the hood lowered and the cooling package in its operating position.

In FIG. 1, the front end of a tractor is shown with the hood down to close the engine compartment. The hood has grilles at its from end to allow engine intake air to enter into the engine compartment. The engine is arranged at the rearward end of the engine compartment and is not shown in the drawings.

A cooling package is mounted in the engine compartment forward of the engine. The cooling package comprises an engine coolant radiator 16, an intake air intercooler 18 and an A/C condenser 20. The intercooler 18 is supported by brackets 22 on the radiator in such a manner that it may be moved from a closed operating position, shown in FIG. 1, to an open cleaning position, shown in FIG. 2. Hoses (not shown) leading to the intercooler 18 are flexible so as not to interfere with its movement.

The need to reposition the intercooler 18 to a cleaning position arises on account of the hostile environment in which tractors frequently operate, which results in debris obstructing the air flow passages in the cooling package.

Conventionally, engine intake air is drawn in from a position in the engine compartment to the rear of the cooling package. This results in the intake air being heated by the heat rejected by the various heat exchangers of the cooling package. Such heating of the intake air is, however, undesirable because it reduced engine efficiency.

To mitigate this problem, the air intake pipe 24 of the engine is fitted, in the illustrated embodiment of the invention, with a duct 26, also termed a snorkel, acting as extension that bypasses the cooling package and drawing fresh cold air directly from a position immediately adjacent the grilles in the hood 10 of the engine compartment. The air intake duct 26 is secured by a bracket 30 to the top of the engine coolant radiator 16 or in another embodiment air intake duct 26 is fixed with a clamp on the air filter mouth and further supported by a foam seal on top of radiator 30.

Figure 2:
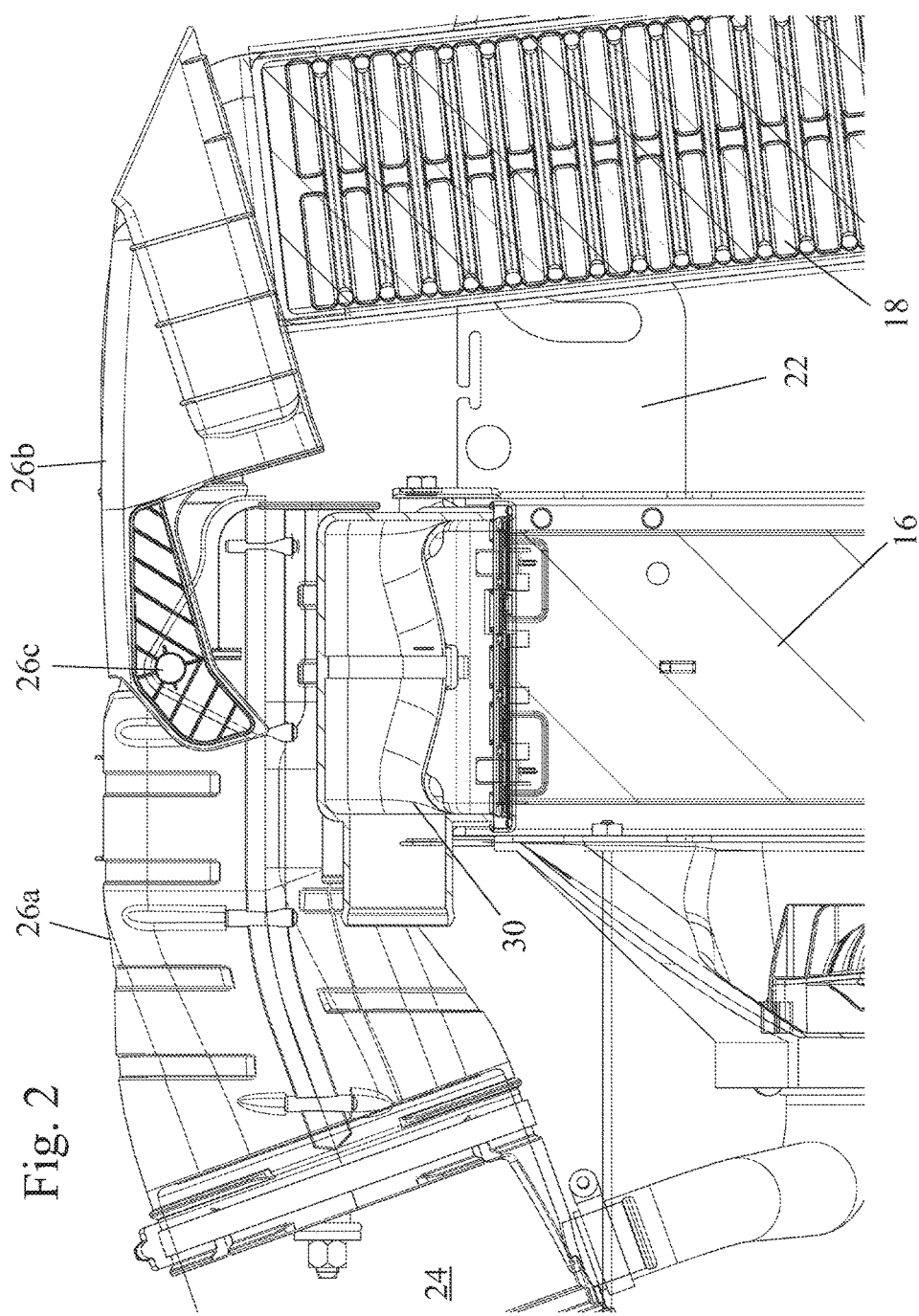
FIG. 2 is a side view similar to that of FIG. 1 with the hood raised and the cooling package in the cleaning position.
Figure 3:
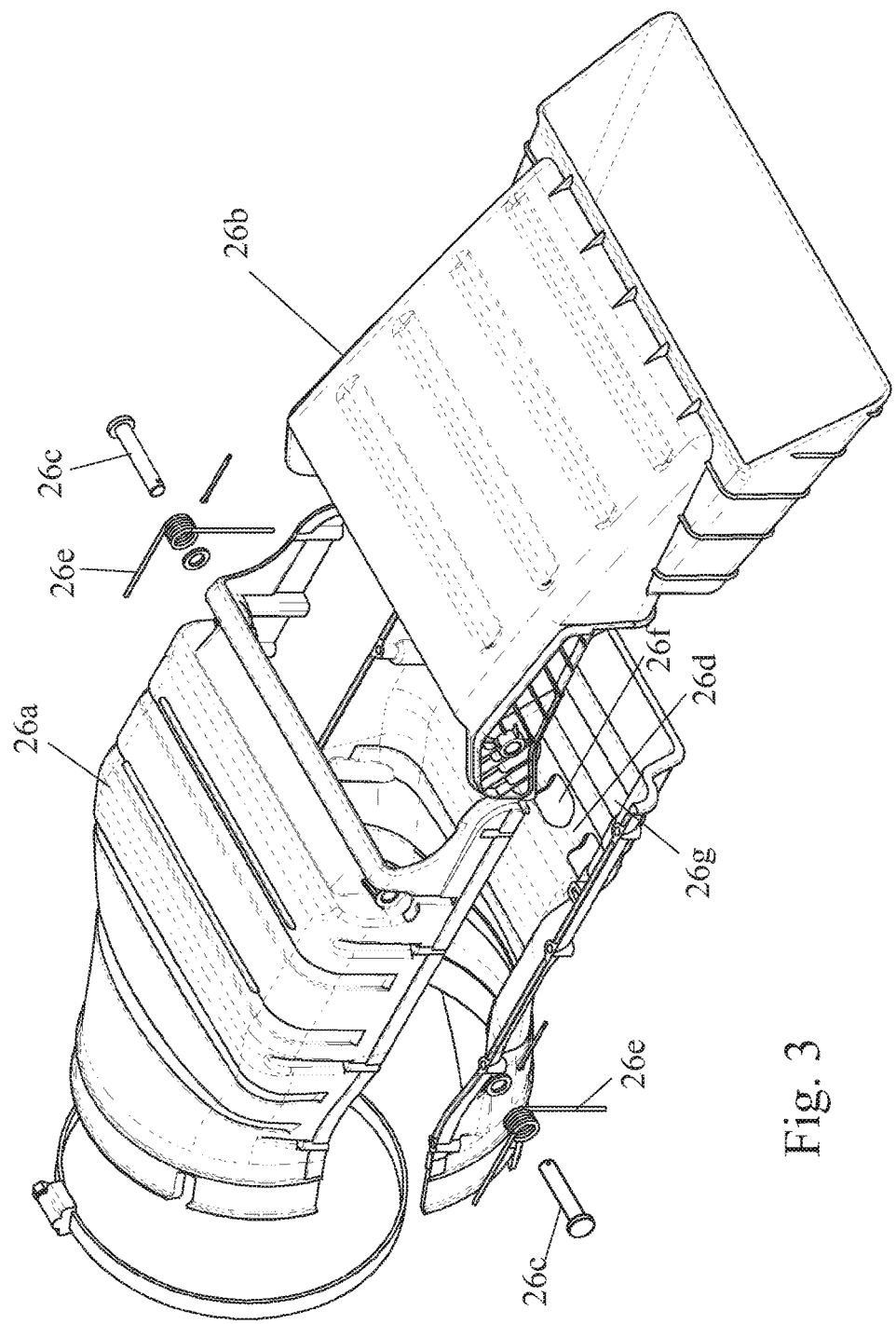
FIG. 3 is a perspective exploded view of the intake air duct in FIGS. 1 and 2.

Were the snorkel 26 to be formed as a one-piece rigid component, having the shape shown in FIG. 1 to occupy most of the space between the cooling package and the inner surface of the hood 10, it would interfere with the hinging of the intercooler 18 and its movement to the cleaning position shown in FIG. 2. To avoid this problem, the duct 26 in the illustrated embodiment of the invention is articulated, being formed of two sections 26a and 26b that are pivotable relative to one another about pivot pins 26c arranged one on each side of the duct 26. The section 26a is stationary and is secured to the coolant radiator 16 by the bracket 30. The section 26b, as best seen in FIG. 3, is biased downwards against the top of the intercooler 18 by springs 26e which act in a sense to rotate the section 26b clockwise relative to the section 26a, as viewed in the drawings. The springs 26e, which are arranged one on each side of the duct 26, allow the section 26b to pivot counter-clockwise about the pins 26c as the intercooler 18 is moved to its cleaning position. On return of the intercooler 18 to the operating position, the springs 26e cause the second section 26b to follow the movement of the intercooler 18 automatically.

In this way, the duct 26 allows clean fresh air to be taken into the engine from near to the grilles 12 without being heated by the cooling package and without interfering with the movement of the intercooler 18 between the operating and cleaning positions.

Because the mouth of the duct 26 is located very near the grilles 12, rain water may enter into the front end of the duct 26. To avoid such water from reaching the engine, the section 26a, which is made up of two initially separate part, has a lower wall 26g formed with an upstanding step 26d that acts as a dam. Drainage holes 26f allow water collecting ahead of the dam to be drained away but the geometry of the step 26d ensures that little, or none, of the engine intake air is drawn in through the drainage holes 26f.

The invention claimed is:

1. An agricultural vehicle comprising an engine compartment, a cooling package mounted near a forward end of the engine compartment, and an engine mounted near a rearward end of the engine compartment;

wherein the cooling package includes a heat exchanger, the heat exchanger is movable between an operating position and a cleaning position, the engine is fitted with an intake air duct leading from the engine to the forward end of the engine compartment, the intake air duct is configured to enable intake air to flow through the intake air duct while bypassing the cooling package, and the intake air duct is articulated to accommodate movement of the heat exchanger between the operating and cleaning positions of the heat exchanger;

wherein the intake air duct is formed of two rigid sections that are pivotable relative to one another, a first section of the two rigid sections is stationarily mounted in the engine compartment, and a second section of the two rigid sections is pivotable from an operating position of the second section to a cleaning position of the second section to accommodate movement of the heat exchanger from the operating position of the heat exchanger to the cleaning position of the heat exchanger, respectively; and wherein the second section is biased away from the cleaning position of the second section and toward the operating position of the second section.

2. The agricultural vehicle as claimed in claim 1, wherein inner surfaces of the first and second sections are smooth to reduce resistance to flow of the intake air.

3. The agricultural vehicle as claimed in claim 2, wherein a step is formed in a lower wall of the intake air duct to act as a dam in a path of water flowing toward the engine, and drainage holes are provided at a bottom of the step.

4. The agricultural vehicle as claimed in claim 1, wherein a step is formed in a lower wall of the intake air duct to act as a dam in a path of water flowing toward the engine, and drainage holes are provided at a bottom of the step.

5. The agricultural vehicle as claimed in claim 1, wherein the intake air duct comprises a pivot pin configured to pivotally couple the first section and the second section.

6. The agricultural vehicle as claimed in claim 5, wherein the intake air duct comprises a spring disposed about the pin and configured to bias the second section away from the cleaning position of the second section and toward the operating position of the second section.

7. An intake air duct of an agricultural vehicle, comprising:

a first section configured to stationarily mount to an engine compartment of the agricultural vehicle;

a second section pivotally coupled to the first section, wherein the second section is pivotable from an operating position to a cleaning position to accommodate movement of a heat exchanger of a cooling package from an operating position of the heat exchanger to a cleaning position of the heat exchanger, respectively; and a biasing element configured to bias the second section away from the cleaning position of the second section and toward the operating position of the second section;

wherein the intake air duct is configured to extend from an engine of the agricultural vehicle, and the intake air duct is configured to enable intake air to flow through the intake air duct while bypassing the cooling package.

8. The intake air duct of claim 7, wherein inner surfaces of the first and second sections are smooth to reduce resistance to flow of the intake air.

9. The intake air duct of claim 7, wherein a step is formed in a lower wall of the intake air duct to act as a dam in a path of water flowing toward the engine, and drainage holes are provided at a bottom of the step.

10. The intake air duct of claim 7, comprising a pivot pin configured to pivotally couple the first section and the second section.

11. The intake air duct of claim 10, wherein the biasing element comprises a spring disposed about the pin and configured to bias the second section away from the cleaning position of the second section and toward the operating position of the second section.

\* \* \* \* \*